March 7, 1933. P. E. SABINE 1,900,522
SOUND ABSORBENT MATERIAL AND PROCESS OF PRODUCING IT
Filed April 6, 1931
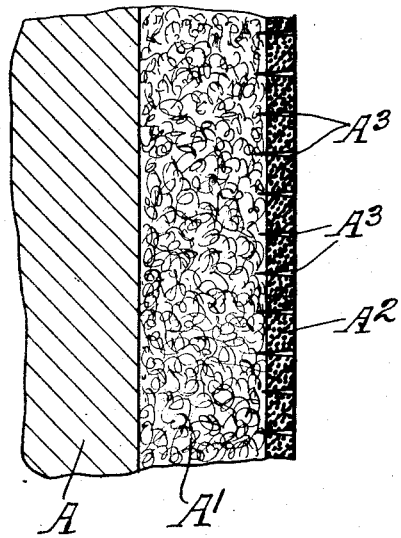
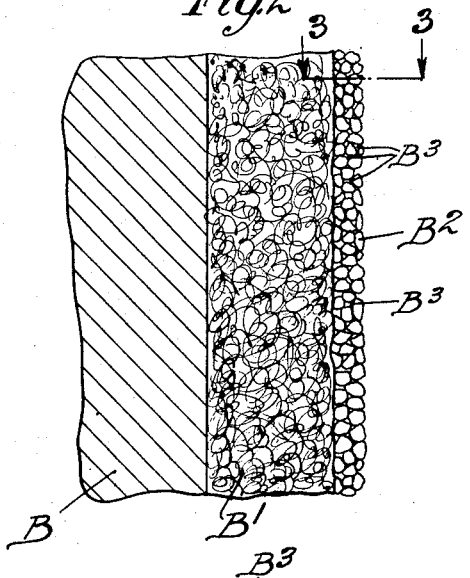
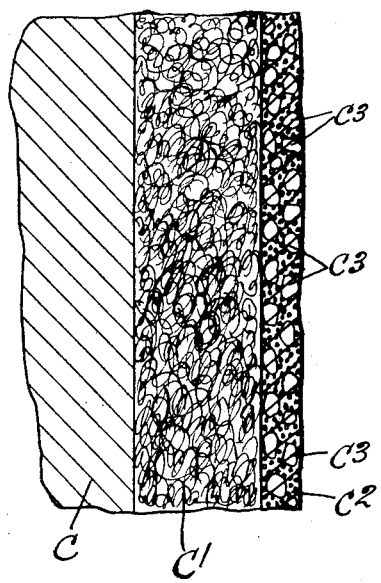
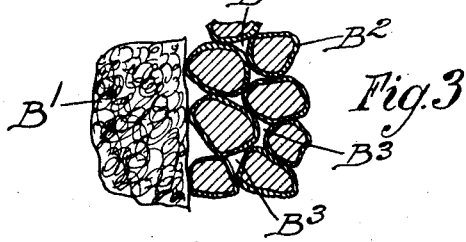
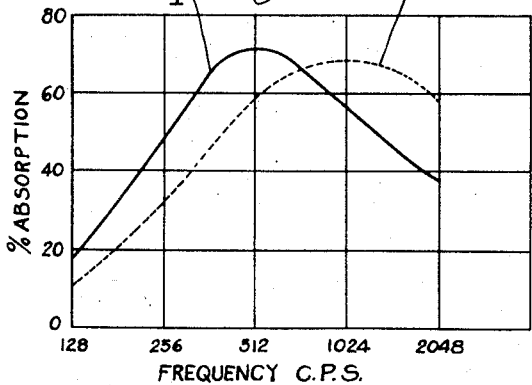
Inventor
Paul E. Sabine
by Parker & Carter
Attorneys.

UNITED STATES PATENT OFFICE

PAUL E. SABINE, OF GENEVA, ILLINOIS, ASSIGNOR OF ONE-HALF TO RIVERBANK LABORATORIES, OF GENEVA, ILLINOIS, A CORPORATION OF ILLINOIS

SOUND ABSORBENT MATERIAL AND PROCESS OF PRODUCING IT

Application filed April 6, 1931. Serial No. 528,045.

This invention relates to a new and improved form of construction adapted to form an exposed finished surface of walls, ceilings or other members, which shall be highly sound absorbent, and also to a new process of producing and finishing the sound absorbent material, member, wall or the like. One embodiment of the invention consists in a combination of a material which is highly absorbent of sound, such as felt, fiber board or the like, but which is not in itself suitable to form an exposed finished surface, with a surface material, such as plaster or plastic paint, of such a nature and so applied as not to destroy the sound absorbent properties of the above mentioned sound absorbent material. The outer covering may be decorative and pleasing to the eye and the combined member or sound absorbing layer or layers so formed are not only highly sound absorbent, but are usable for finishing a room, ceiling, wall or the like.

I illustrate my invention more or less diagrammatically in the accompanying drawing, wherein—

Figure 1 is a section through one embodiment of my invention;

Figure 2 is a section through another embodiment;

Figure 3 is a section on the line 3—3 of Figure 2;

Figure 4 is a section through a third embodiment of my invention; and

Figure 5 diagrammatically illustrates the sound absorption characteristics.

Like parts are indicated by like symbols throughout the specification and drawing.

Referring to Figure 1, A indicates any suitable wall or base or supporting member to which the sound absorptive material is to be applied. $A^1$ indicates a layer of fibrous or porous material which may be cemented or otherwise secured to the wall A. $A^2$ is a thin layer of plaster or plastic paint or other suitable surfacing material, which is preferably not thicker than $\frac{1}{8}$ of an inch and which may for example be applied in the usual manner directly to the porous or fibrous layer $A^1$. For example a plastic paint may be painted or sprayed directly upon the surface of the layer $A^1$ which might for example be a layer of felt or other suitable fibrous material. The plastic surface $A^2$ may be perforated while still plastic, by means of steel needles mounted on a flat board and pressed into the plastic surface. The holes made by such needles are indicated as at $A^3$. I do not wish to be limited to any specific method of making the apertures as, for example, the needles might be mounted on a cylindrical roller which can be rolled over the soft surface of the plaster or plastic paint.

Figure 2 indicates a variant or alternative exemplification of my invention. B indicates a wall surface or supporting member or base, to which may be applied any suitable fibrous or porous layer $B^1$ having the desired sound absorbent characteristics. The layer $B^1$ may be cemented or otherwise secured to the wall surface B. $B^2$ indicates a plaster surface composed of granular particles which may be of nearly uniform size but of irregular shape, with only a small amount of bonding or cementitious material employed. The result is a hardened surface layer comprising solid particles bonded only at their points of contact. Such a surface layer will allow the passage of sound through the inter-granular interstices to the felt or other fibrous material beneath. Experiment indicates that in thin layers such a construction is highly transparent to sound, that is, allows a ready passage of sound therethrough, although if employed in layers substantially thicker, say several times thicker than the layer I employ, there may be interference with the passage of sound. It is, therefore, characteristic of this form of my invention that I employ, in connection with an underlying layer of felt or other suitable material a finishing layer of particles cemented together at their points of contact, but leaving sufficient inter-granular interstices to permit the ready passage of sound therethrough. The existence of these intersticial spaces is well indicated as at $B^3$ in Figure 3.

Figure 4 indicates a third exemplification of my invention. C indicates the wall structure or suitable supporting member, to which may be secured in any suitable fashion the fibrous or porous sound absorptive layer $C^1$ of felt or the like. $C^2$ indicates the sound pervious finishing cut in the form of a masonry surface layer which includes granular particles $C^3$ of irregular shape so as to prevent close packing, which are bonded with a porous cementitious material which may be for example such as is described in my Patent 1,458,631, for a sound absorbing plaster issued on June 12, 1923. It is characteristic of this form of my present invention that I employ the sound transmitting properties of a thin surfaced layer of this material, in conjunction with the backing or underlying layer $C^1$ of material highly absorbent of sound.

Figure 5 presents graphically the effect of applying the surface treatment of a stiff sound transmitting surface layer to the felt or other fibrous material, upon its absorbing efficiency for tones of low pitch. The curve X shows the percentage of sound frequencies ranging from 128 to 2048 cycles per second by a felt layer one inch thick without a plaster surface. Curve Y shows the percentage of absorption of the same material when combined with a surface layer of plaster or plastic paint ⅛ inch thick applied and treated in accordance with the above mentioned methods. The shift of the peak of absorption toward the lower frequencies is a marked advantage for the acoustical treatment of rooms such as broadcasting studios and sound recording studios where low frequency absorption is desirable, and is one of the useful ends attained by my invention. It will be noted that by the employment of my invention I make it possible to absorb much more strongly at the low frequencies than when felt alone is employed. Felt absorbs little at the low frequencies and hence permits booming, which is highly undesirable for example in connection with broadcasting and sound recording rooms.

I have illustrated in my drawing and described the application of a sound absorbent layer such as $A^1$, $B^1$ or $C^1$, to a fixed wall or base A, B or C, with the further addition of the thin sound pervious finishing layer $A^2$, $B^2$ or $C^2$. It will be understood, however, that I may form composite members comprising a backing layer of plaster board or the like to which is attached the sound-absorbing layer and attached thereto the sound pervious layer, the whole constituting a preformed unit which may be nailed or otherwise attached directly to supporting wall studs or ceiling beams, or to furring strips attached to existing walls or ceilings. It will be understood in general that I wish my description and drawing to be taken as in a broad sense illustrative and diagrammatic rather than as limiting me to the specific details described and shown and many changes may be made in the materials employed and in the relationship and thickness and characteristics of the various members, without departing from the spirit of my invention.

I claim:

1. The method of rendering walls, ceilings and the like sound absorbent which includes applying to the surface to be treated a sound absorbent layer, applying to the sound absorbent layer a layer of plastic material, and forming a plurality of apertures in said plastic material.

2. The method of rendering walls, ceilings and the like sound absorbent which includes applying to the surface to be treated a sound absorbent layer, applying to the sound absorbent layer a layer of plastic material, and forming a plurality of apertures in said plastic material while said plastic material is still in plastic condition.

3. A sound absorbing means for walls, ceilings and the like which includes a sound absorptive layer associated with the surface to be treated and an apertured plastic sound pervious layer adhering to the sound absorptive layer.

4. An absorbing means for walls, ceilings and the like which includes a sound absorptive layer associated with the surface to be treated, and a plastic sound pervious layer adhering to the sound absorptive layer, said sound pervious plastic layer including a plurality of particles of irregular shape bonded to each other at their engaging portions whereby to define voids within the plastic layer.

5. An absorbing means for walls, ceilings and the like which includes a sound absorptive layer associated with the surface to be treated, and a plastically applied sound pervious layer adhering to the sound absorptive layer, said layer of plastic material including a plurality of particles bonded with a porous cementitious material.

Signed at Geneva, county of Kane and State of Illinois, this 24th day of March 1931.

PAUL E. SABINE.